April 29, 1958 A. H. EMERY 2,832,151
ADJUSTABLE DIAL INDICATOR GAGES
Filed Oct. 21, 1955

INVENTOR
ALFRED H. EMERY
BY
ATTORNEY

2,832,151
ADJUSTABLE DIAL INDICATOR GAGES

Alfred Hamilton Emery, Poughkeepsie, N. Y.

Application October 21, 1955, Serial No. 541,911

10 Claims. (Cl. 33—172)

This invention relates to dial indicators of the rack and pinion type.

The object of the invention is to provide simple means, in a dial indicator gage, to adjust the instrument to extreme accuracy, this means being embodied in two forms, one to clamp the device to a starting position from which the calibration of the pointer over the dial is most nearly perfect and the other a means for quickly moving the rack and pinion to a new mutually cooperative poition where therefore unused teeth of the two will come into mesh and particularly where the starting position of the pointer will not be changed.

It is known that in the manufacture of all types of dial indicators, either gages of the present type or larger instruments, such as electrical meters, the only way to achieve extreme accuracy is to have such instrument calibrated and to then calculate a reading with the aid of the precisely formed calibration chart. Such a calibration chart is usually provided with instruments where a knowledge of the true reading is of vital importance. Now it so happens that there is usually some portion of a dial where the readings of the pointer and the true readings correspond almost exactly and this portion may be more or less great in extent. In a dial indicator gage where the actual reading of the dial is not so important as a small difference in readings, it would be of advantage to make the starting point for reading at the lower limit of an area of extreme accuracy. Accordingly, a means for clamping the gage at such a starting point is herein provided.

A feature of the invention is a movable sleeve about the spindle and within the stem of the device which may be fixed when the spindle has been pressed to the point where the indicator hand is about to play over the most accurately divided portion of the dial. This sleeve may be fixed firmly to the stem of the gage in any convenient manner, such as by means of a set screw.

It may also be noted that where a dial indicator gage has been in long use the meshing teeth of the rack and pinion may become worn, particularly at the starting position and while for most work this makes little difference as the readings are only comparative, still there may be times when extreme accuracy is required. Under these circumstances the spindle may be pushed in to the point where ordinarily unused teeth of the rack and pinion are brought into mesh and then the adjusting sleeve secured so that the needle is set at a new starting point where it will not only play over a well calibrated portion of the dial but where unworn teeth will be used.

A feature of the invention is a shim or spacer placed between the upper end of the rack bar and its stop whereby the pinion meshes with the teeth of the rack at the upper portion thereof and which spacer is quickly and easily removable so that new and unworn teeth may be engaged. As a convenience, this shim or spacer is of such a thickness that upon its removal the hand will make a complete rotation and its starting point with respect to the dial, will thus not be changed.

A feature of the invention is the provision of a shim or spacer in the form of a spiral of wire wound fairly tightly about the stop pin of the device. The tightness of the wind is sufficient to hold the spiral in place by friction but not so tight that the whole spiral cannot be moved along its axis to a point where one or more turns normally between the upper end of the rack and the stop pin are now moved clear of the rack. When this spiral shim is so moved the rack will move upwardly by an amount sufficient to rotate the hand once completely over the dial.

Another feature of the invention is a combination of a first means for making a major adjustment and a second means for making a minor adjustment, such adjustments being a movement in position of the rack bar and a consequent cooperative movement of the pinion and thus of the dial indicator hand. The means for making the major adjustment consists of a shim in the form of a wire wound spirally about the spindle guide pin which is a thickness equal to a movement of the rack bar to cause a complete revolution of the hand over the dial. Thus the placing of this shim in position between the rack bar and the guide pin or the removal of the shim therefrom will cause a major adjustment in the cooperative positions of the teeth of the rack and pinion. The means for making a minor adjustment consists of a sleeve over the spindle and within the casing which may be secured to the casing to form a back stop for the spindle after the spindle has been pressed in a predetermined amount. This minor adjustment may be made to bring comparatively unworn teeth into play or to set the hand at a starting position before a particularly accurate range.

Other features will appear hereinafter.

The drawings consist of a single sheet having five figures, as follows.

Figure 4:
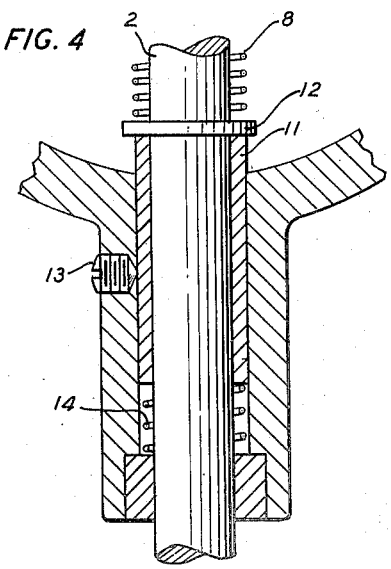
Figure 5:
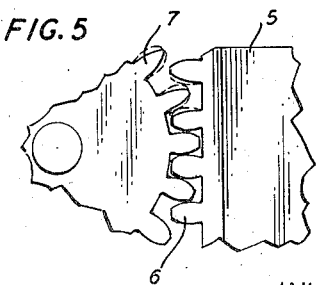

Fig. 4 is another enlarged detail partly in section showing the adjusting sleeve and the manner of securing it in place after it has been moved to a position where the hand is about to play over a selected and highly accurate range of the dial; and Fig. 5 is an exaggerated showing of the meshing teeth of the pinion and rack, indicating how the hack has been moved upwardly until worn teeth have been moved out of play and fresh unworn teeth have been engaged.

The dial indicator of the present invention is a simple device having a case 1 in which a spindle 2 is slidably mounted so that it may be moved along its axis. It is prevented from rotating by a spindle guide pin 3 which slides within a slot, parallel to the axis of the spindle, in the guide 4. A rack bar 5 is slidably mounted on the spindle 2 and is provided with a set of teeth 6 with which the teeth 7 of a pinion mesh. The rack bar 5 is normally urged upwardly by a spring 8 until its upper end is stopped by the spindle guide pin 3. Under usual conditions the spring 8 will hold the rack bar tightly against the guide pin 3 so that the movement of the rack bar 5 is the same as the spindle 2, but on occasion when the spindle 2 is violently and suddenly moved upwardly the spring 8 gives and the rack bar follows the spindle slowly, thus providing a shock proof feature.

The rack bar 5 is prevented from rotating by a guide pin 9, also movable in the slot in the guide 4.

Figure 1:
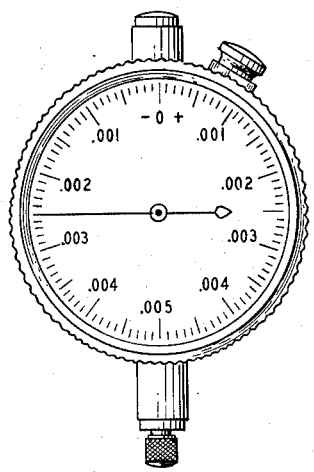
Fig. 1 is a general view of a dial indicator gage, showing the indicator hand as it is usually placed at "nine o'clock"
Figure 2:
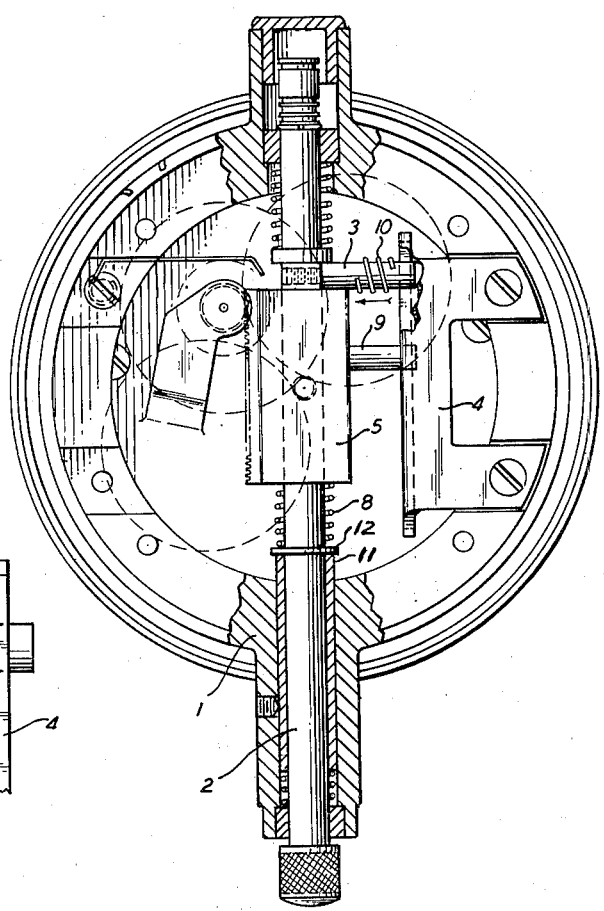
Fig. 2 is an enlarged view showing the back removed and some portions in section.
Figure 3:
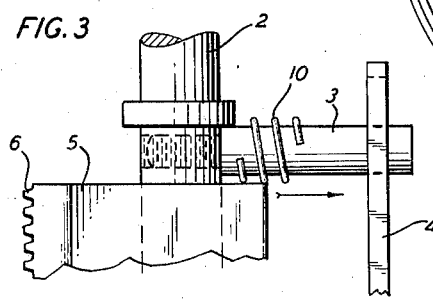
Fig. 3 is an enlarged detail portion showing the spiral shim as placed on the spindle guide pin which acts as an upper stop for the rack bar slidably mounted on the spindle.

There is a spiral shim 10 in the form of a wire wound about the spindle guide pin 3, shown in Fig. 2 as pushed to the right where no one of its turns comes between the top of the rack bar 5 and the guide pin 3. In Fig. 3 this shim is shown as pushed to the left so as to space the rack bar 5 away from the guide pin 3. In the position shown in Fig. 3 the uppermost teeth of the rack would be in mesh with the teeth of the pinion. Let us assume that in time these meshing teeth become very badly worn, as indicated (in a greatly exaggerated manner) in Fig. 5. Thereupon the spiral shim 10 may be moved to the right, as indicated in Fig. 2, so that the rack bar 5 will move upwardly, as indicated in Fig. 5, to the point where unworn teeth are engaged. While it is not necessary, it is convenient that the thickness of the spiral shim be such that in either position thereof the dial hand will be at the same position.

There is shown in Fig. 4, a sleeve 11 which is movable along the spindle 2 and also within the casing 1, but which may be secured to the casing by any convenient means, such as a set screw 13. A stop ring 12 may be secured to the spindle 2 as a bearing for the rack spring 8 and also as a stop for the downward movement of the rack 5.

If it is desired to move the rack upwardly to a point where new teeth of the pinion and rack are brought into play, then the set screw 13 is loosened and the spindle is pushed upwardly the desired amount. By means of a spring 14 the sleeve will follow the spindle and when the new position is attained the sleeve may be secured by the set screw 13.

In the same manner the set screw 13 may be loosened and the dial indicator spindle 2 pushed until the hand enters a region of extreme accuracy, as shown by a calibration of the dial, whereupon the sleeve 11 may be secured as before. Thereafter the dial indicator may be used to provide extremely accurate readings, starting from this point as fixed by the adjustment of the sleeve 11.

It may be noted that by the use of the spiral wire shim 10 a major adjustment in the position of the hand and by the same token a major adjustment in the relative meshing of the teeth of the pinion and the rack may be made, while with the use of the sleeve 11 a minor adjustment in the position of the hand and the meshing of the teeth may be made.

It is to be particularly noted that the use of the sleeve 11 for adjusting the range of the mesh between the pinion and the teeth moved by the spindle is not confined to the so-called shock proof gage but may equal facility be used in the simpler types of gage where the rack bar is secured to the spindle or where the rack bar teeth are actually cut into the spindle.

What is claimed is:

1. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, a back stop for said spindle for fixing the normal starting position of said rack bar, and means for adjustably changing the position of said back stop, at any one of an unlimited number of points over a continuous range.

2. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, a sleeve for said spindle at the lower end thereof constituting a back stop for said spindle, and means for adjustably fixing said sleeve to said casing.

3. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, a sleeve fitted between said casing and said spindle at the lower end thereof, means for adjustably fixing said sleeve to said casing, and a back stop fixed to said spindle to limit the outward thrust of said spindle.

4. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, a stop on said spindle for limiting the outward movement of said spindle from said casing, a compression spring wound about said spindle pressing at one end on said stop and at the other end on said rack bar, and a sleeve adjustably secured to said casing for cooperation with said spindle stop.

5. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, and a shim in the form of a spiral wire wound about said guide pin for changing the relative normal position of said rack bar on said spindle, said spiral spring shim being movable along said guide pin into and out of position between said rack bar and said guide pin.

6. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, and a shim in the form of a spiral wire wound about said guide pin for changing the relative normal position of said rack bar on said spindle, said spiral shim being movable along said guide pin into and out of position between said rack bar and said guide pin, said wire shim being of a thickness equal to the travel of said rack bar to produce a complete rotation of said hand.

7. In a dial indicator, a casing, a spindle slidably mounted therein and having a movement of translation along the longitudinal axis thereof, a guide pin secured to said spindle moving in a slot provided in said casing for preventing rotation of said spindle, rack teeth movable by said spindle, a pinion having teeth meshing with said teeth for driving an indicator hand, a sleeve for said spindle at the lower end thereof constituting a back stop for said spindle, and means for adjustably fixing said sleeve to said casing.

8. In a dial indicator, a casing, a spindle slidably mounted therein and having a movement of translation along the longitudinal axis thereof, a rack bar mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, a shim for changing the normal position of said rack bar on said spindle relative to said guide pin to make a major adjustment in the relative tooth meshing of said rack and pinion, and a sleeve in said casing enclosing said spindle and adjustably secured to said casing for making a minor adjustment in the relative tooth meshing of said rack and pinion.

9. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, and a spacer for changing the relative normal position of said rack bar on said spindle and guide pin, said spacer being of uniform and predetermined thickness for moving said hand exactly one complete revolution over said dial.

10. In a dial indicator, a casing, a spindle slidably mounted therein and having a movement of translation along the longitudinal axis thereof, a rack bar slidably mounted on said spindle, a guide pin secured to said spindle moving in a slot fixed to said casing for preventing rotation of said spindle, spring means for constantly urging said rack bar against said guide pin as a stop, teeth on said rack bar, a pinion having teeth meshing with said rack bar teeth for driving an indicator hand, an indicator hand and a dial mounted in cooperative relationship therewith, and back stop means for said spindle for fixing the normal starting position of said rack bar and said indicator hand, said back stop means consisting of a rough adjustment means for setting said indicator hand at a zero position on said dial for different range settings and a fine adjustment means for setting said indicator hand at other desired positions on said dial.

References Cited in the file of this patent

UNITED STATES PATENTS

| | | |
|---|---|---|
| 2,476,713 | Emery | July 19, 1949 |
| 2,799,941 | Emery | July 23, 1957 |